United States Patent
Zhang et al.

(10) Patent No.: US 12,021,851 B2
(45) Date of Patent: Jun. 25, 2024

(54) SESSION RECOVERY MECHANISM

(71) Applicant: NetApp, Inc., San Jose, CA (US)

(72) Inventors: Jin Zhang, Cary, NC (US); Surajpal S. Sandhu, Cary, NC (US); Matthew Martin Houston, Raleigh, NC (US)

(73) Assignee: NetApp, Inc., San Jose, CA (US)

(*) Notice: Subject to any disclaimer, the term of this patent is extended or adjusted under 35 U.S.C. 154(b) by 322 days.

(21) Appl. No.: 17/517,460

(22) Filed: Nov. 2, 2021

(65) Prior Publication Data

US 2023/0135158 A1 May 4, 2023

(51) Int. Cl.
*H04L 9/40* (2022.01)
*H04L 67/148* (2022.01)

(52) U.S. Cl.
CPC ........ *H04L 63/0485* (2013.01); *H04L 63/061* (2013.01); *H04L 63/20* (2013.01); *H04L 67/148* (2013.01)

(58) Field of Classification Search
CPC .......................... H04L 63/0485; H04L 63/061
USPC ............................................................ 726/1
See application file for complete search history.

(56) References Cited

U.S. PATENT DOCUMENTS

| | | | |
|---|---|---|---|
| 2004/0268124 A1* | 12/2004 | Narayanan | H04L 63/102 713/164 |
| 2012/0117617 A1* | 5/2012 | Krupp | H04L 63/20 726/1 |
| 2016/0021194 A1* | 1/2016 | Prabhakar | H04L 63/0272 709/204 |

* cited by examiner

*Primary Examiner* — Michael S McNally
(74) *Attorney, Agent, or Firm* — Jaffery Watson Mendonsa & Hamilton LLP

(57) ABSTRACT

A system is described. The system includes a processing resource and a non-transitory computer-readable medium, coupled to the processing resource, having stored therein instructions that when executed by the processing resource cause the processing resource to detect an unrecognized Internet Protocol Security (IPsec) packet associated with an IP address at a first node within a cluster, retrieve one or more selector fields from the IPsec packet, query of a security policy database to determine whether a destination IP address included in the one or more retrieved selector fields matches one or more matching outbound IPsec policies associated with a destination IP address, determine whether a matching outbound IPsec policy includes an IPsec policy associated with the destination address entry and establish the first IPsec SA communication session between the first node and the client based on the outbound IPsec policy.

20 Claims, 8 Drawing Sheets

SESSION RECOVERY MECHANISM

BACKGROUND

In data storage architectures, a client's data may be stored in a volume. The client can access the client data from the volume via one or more volume servers coupled to the volume. The volume servers can map the locations of the data specified by the client, such as file name, drive name, etc., into unique identifiers that are specific to the location of the client's data on the volume. Using the volatile server as an interface to the volume allows the freedom to distribute the data evenly over the one or more volumes. The even distribution of data can be beneficial in terms of volume and system performance.

Communications sessions are established between the client and the volumes. These communications sessions are typically secured via Internet Protocol Security (IPsec) security association (SA). IPsec SA specifies security properties that are recognized by communicating hosts. These hosts typically require two SAs to communicate securely. A single SA protects data in one direction. The protection is either to a single host or a group (multicast) address. Because most communication is peer-to-peer or client-to-server, two SAs must be present to secure traffic in both directions. Internet Key Exchange (IKE) SA is implemented to establish a secure channel between endpoints to exchange notifications and to negotiate IPsec SAs.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
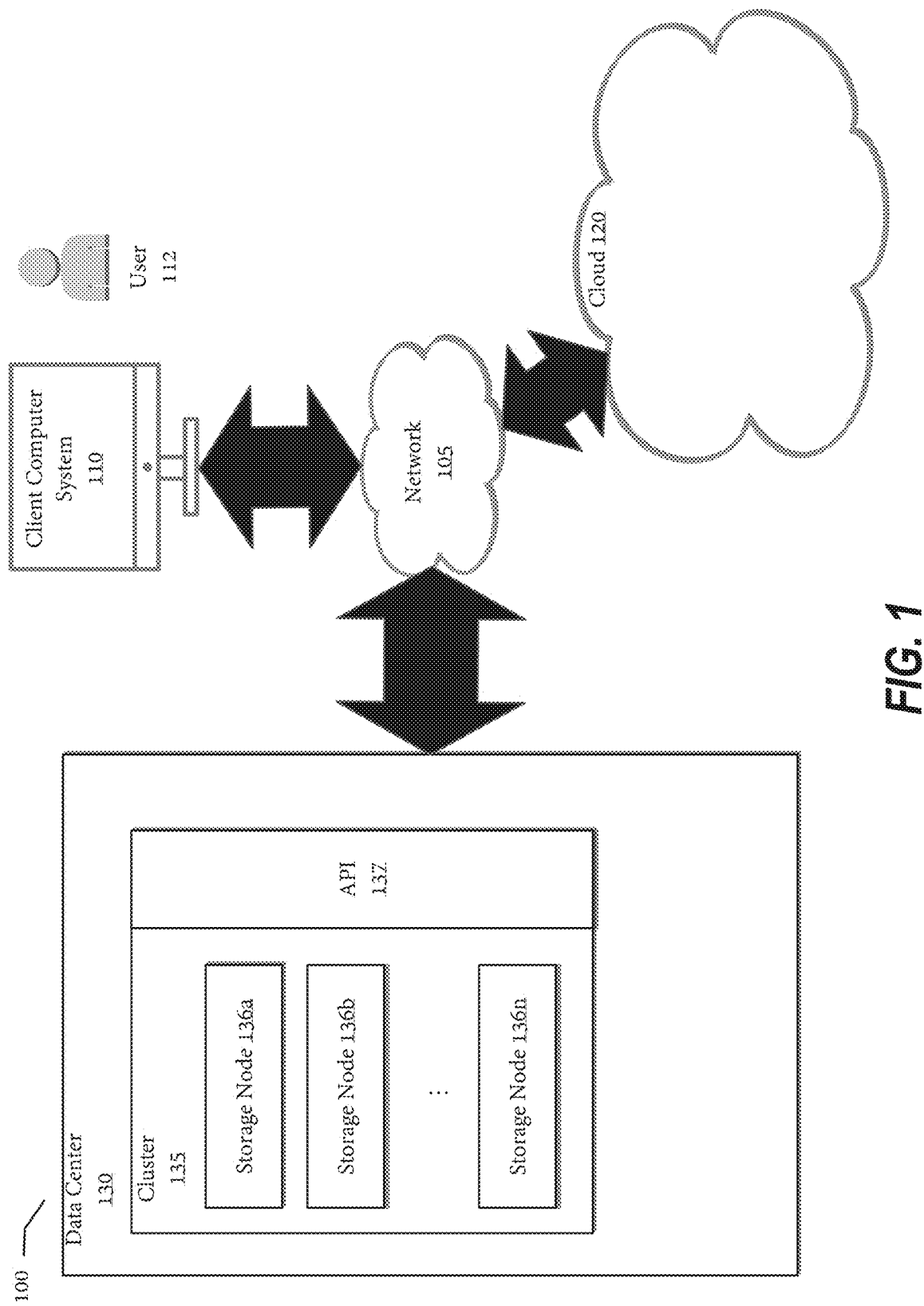
FIG. 1 is a graph illustrating one embodiment of an input-output operations estimation.

As discussed above, communications sessions between a client and node volumes are secured via IPsec SA. A problem occurs, however, whenever an IP address is migrated from one node to another node at which a communications sessions has initially been established. In such an instance, the previous IPsec sessions involving this IP address will become abandoned. Based on the IPsec standard a cleanup notification message should be sent to the other endpoint (e.g., a client machine) upon a termination that an IPsec session has been terminated for any reason. However, the standard does not consider the above-described IP address migration scenario. For example, a cleanup notification message notification cannot be reliably transmitted to the client unless migration processing is performed, which introduces expensive callbacks from third party package that is not always reliable.

Since a cleanup notification cannot be delivered to the client, the client will continue to use the previous IPsec SA session to transmit encrypted packets to the IP address, which is now hosted at the new node. However, the new node has no knowledge regarding the previous IPsec session that was negotiated at the previous hosting node. Thus, the unrecognized IPsec packet will be dropped (e.g., according to the IPsec standard). In the conventional scenario in which there continues to be an IKE SA session between these two endpoints, a notification is transmitted through the IKE SA to the client requesting the client to delete the unrecognized IPsec SA. However, there is no longer IPsec SA or IKE SA communications sessions with the client IP since the address has previously been just migrated to the new node. Accordingly, the client will continue to transmit encrypted IPsec packets, which will continue to be dropped, to the node without feedback. Such traffic interruption could last until the client's next IPsec renegotiation time, which is typically hours later.

In one embodiment, an IPsec session recovery mechanism is provided to initiate and establish a new IKE SA and IPsec SA between the client and an IP address at a migrated node immediately upon an unrecognized IPsec packet being received at the new node. In such an embodiment, a reverse IPsec policy lookup is performed using an inbound Encapsulating Security Payload (ESP) packet in order to reestablish the IPsec SA and IKE SA initiating from the node side. As defined herein, an IPsec packet is a packet of data encrypted according to the IPsec protocol, and an unrecognized IPsec packet is a received packet that has an unrecognized destination IP address (e.g., an IP address not included in a node security policy database).

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 2:
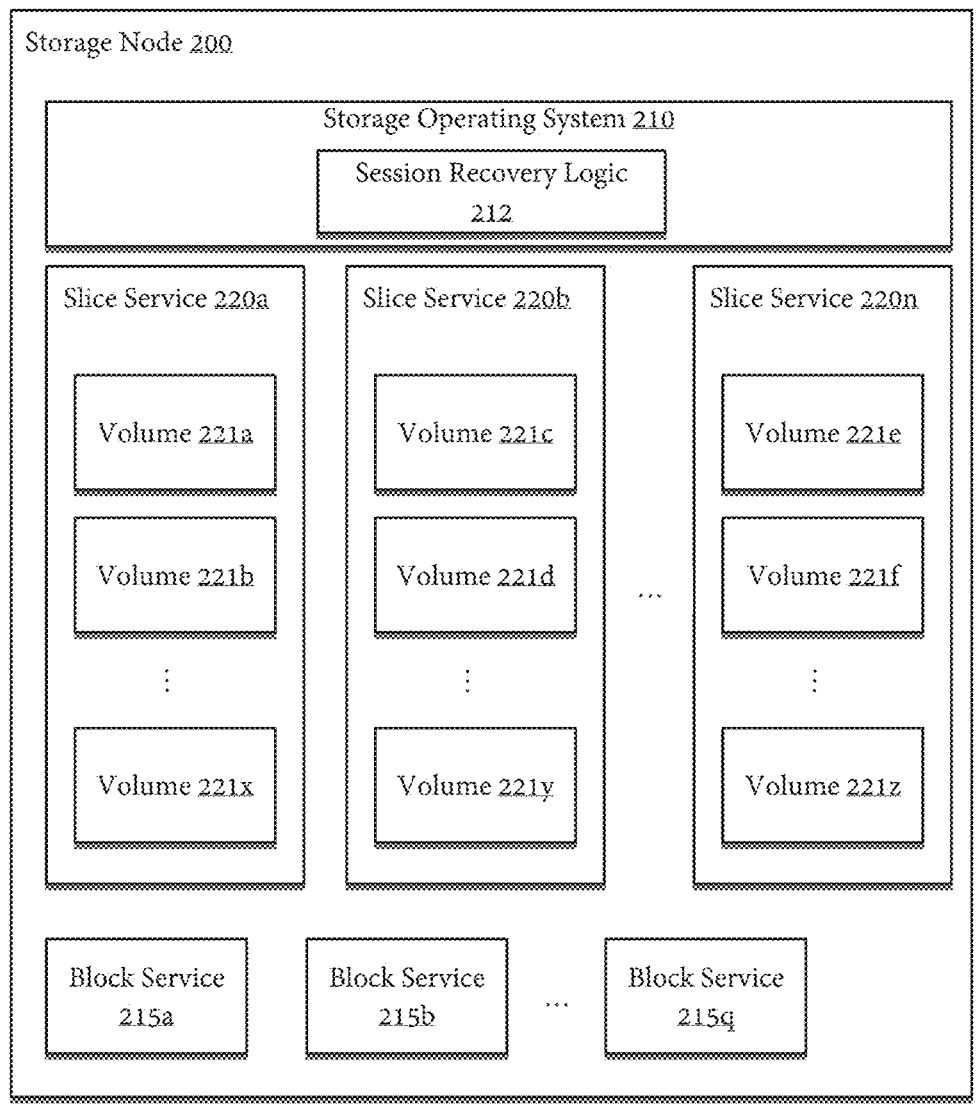
FIG. 2 is a block diagram illustrating an environment in which various embodiments may be implemented.

FIG. 2 is a block diagram illustrating an environment 100 in which various embodiments may be implemented. In various examples described herein, an administrator (e.g., user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on a client computer system (or client) 110. In one embodiment, the administrator and/or automated means may use various statistics, analytics and/or visual representations of the gathered data as feedback to improve the functioning of the monitored systems by, for example, tuning various configuration parameters of the managed distributed storage systems and/or delivering storage operating system patches, version upgrades, or the like to the managed distributed storage systems.

In the context of the present example, the environment 100 includes a data center 130, a cloud 120, a client computer system 110, and a user 112. The data center 130, the cloud 120, and the client computer system 110 are coupled in communication via a network 105, which, depending upon the particular implementation, may be a Local Area Network (LAN), a Wide Area Network (WAN), or the Internet.

The data center 130 may represent an enterprise data center (e.g., an on-premises customer data center) that is build, owned, and operated by a company or the data center 130 may be managed by a third party (or a managed service provider) on behalf of the company, which may lease the equipment and infrastructure. Alternatively, the data center 130 may represent a colocation data center in which a company rents space of a facility owned by others and located off the company premises. The data center 130 is shown including a distributed storage system (e.g., cluster 135). Those of ordinary skill in the art will appreciate additional IT infrastructure would typically be part of the data center 130; however, discussion of such additional IT infrastructure is unnecessary to the understanding of the various embodiments described herein.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 3.

The API 137 may provide an interface through which the cluster 135 is configured and/or queried by external actors (e.g., the client computer system 110 and a cloud-based, centralized monitoring system. Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, a first API call (e.g., GetNodeStats) may be used to obtain information regarding a custom, proprietary, or standardized measure of the overall load (e.g., SS load) or overall performance (e.g., IOPS) of a particular storage node 136 or a second API call (e.g., ListNodeStats) may be used to obtain information regarding the overall load or performance of multiple storage nodes 136. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the cloud 120, which may represent a private or public cloud accessible (e.g., via a web portal) to an administrator associated with a managed service provide and/or administrators of one or more customers of the managed service provider, includes a cloud-based, centralized monitoring system. The monitoring system may periodically receive monitored information, including raw and/or processed telemetry data (e.g., frequency distributions representing aggregated telemetry data over time) of multiple clusters (e.g., cluster 135) from multiple distributed collectors operable within respective data centers (e.g., data center 130) of one or more customers of the managed service provider.

As noted above, the monitored information may represent hundreds of thousands of observations (samples) of telemetry data over a period of time in which the vast majority of telemetry data may represent normal operating conditions, but a small number of occurrences (e.g., telemetry data exceeding certain thresholds) may be indicative of events of significance (e.g., an abnormal condition, imminent need for increased storage capacity, imminent failure of a storage node 136, or the like).

While for sake of brevity, only a single data center and a single cluster are shown in the context of the present example, it is to be appreciated that multiple clusters owned by or leased by the same or different companies may be monitored in accordance with the methodologies described herein and such clusters may reside in multiple data centers of different types (e.g., enterprise data centers, managed services data centers, or colocation data centers).

FIG. 3 is a block diagram illustrating a storage node 200 in accordance with an embodiment of the present disclosure. Storage node 200 represents a non-limiting example of storage nodes 136a-n. In the context of the present example, storage node 200 includes a storage operating system 210, one or more slice services 220a-n, and one or more block services 215a-q. The storage operating system (OS) 210 may provide access to data stored by the storage node 200 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 210 is NetApp Element Software (e.g., the SolidFire Element OS) based on Linux and designed for SSDs and scale-out architecture with the ability to expand up to 100 storage nodes.

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220a-n may store metadata that maps between client systems and block services 215. For example, slice services 220 may map between the client addressing used by the client systems (e.g., file names, object names, block numbers, etc. such as Logical Block Addresses (LBAs)) and block layer addressing (e.g., block identifiers) used in block services 215. Further, block services 215 may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

As noted above, in some embodiments, a collector module may poll an API (e.g., API 137) of a distributed storage system (e.g., cluster 135) of which the storage node 200 is a part to obtain various telemetry data of the distributed storage system. The telemetry data may represent performance metrics, configuration and other system data associated with various levels or layers of the cluster or the storage node 200. For example, metrics may be available for individual or groups of storage nodes (e.g., 136a-n), individual or groups of volumes 221, individual or groups of slice services 220, and/or individual or groups of block services 215.

Figure 3A:
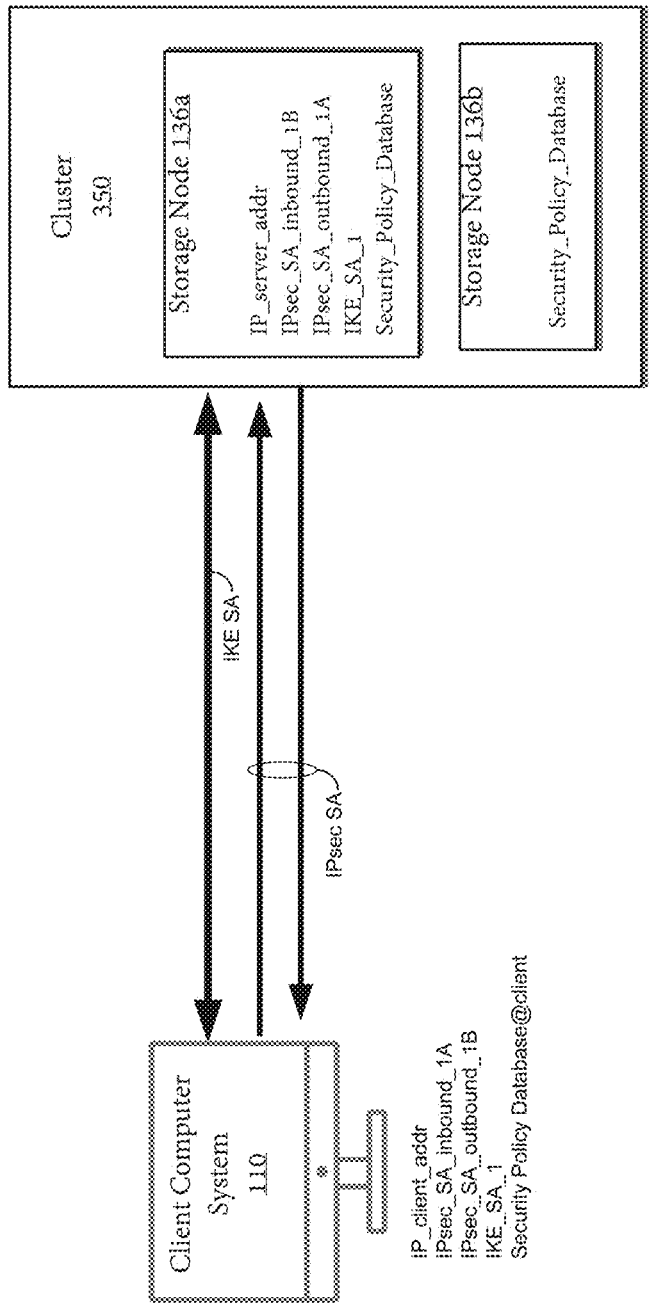
FIGS. 3A-3C illustrate embodiments of communication sessions between a client and cluster nodes.
Figure 3B:
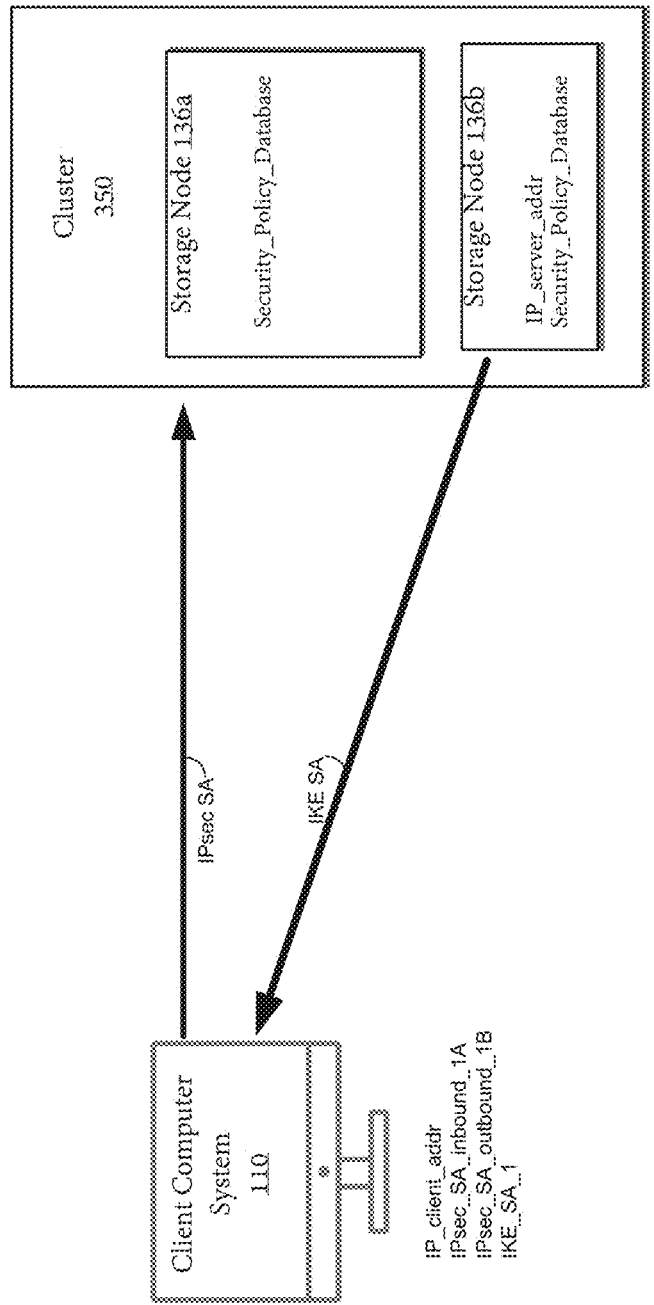
Figure 3C:
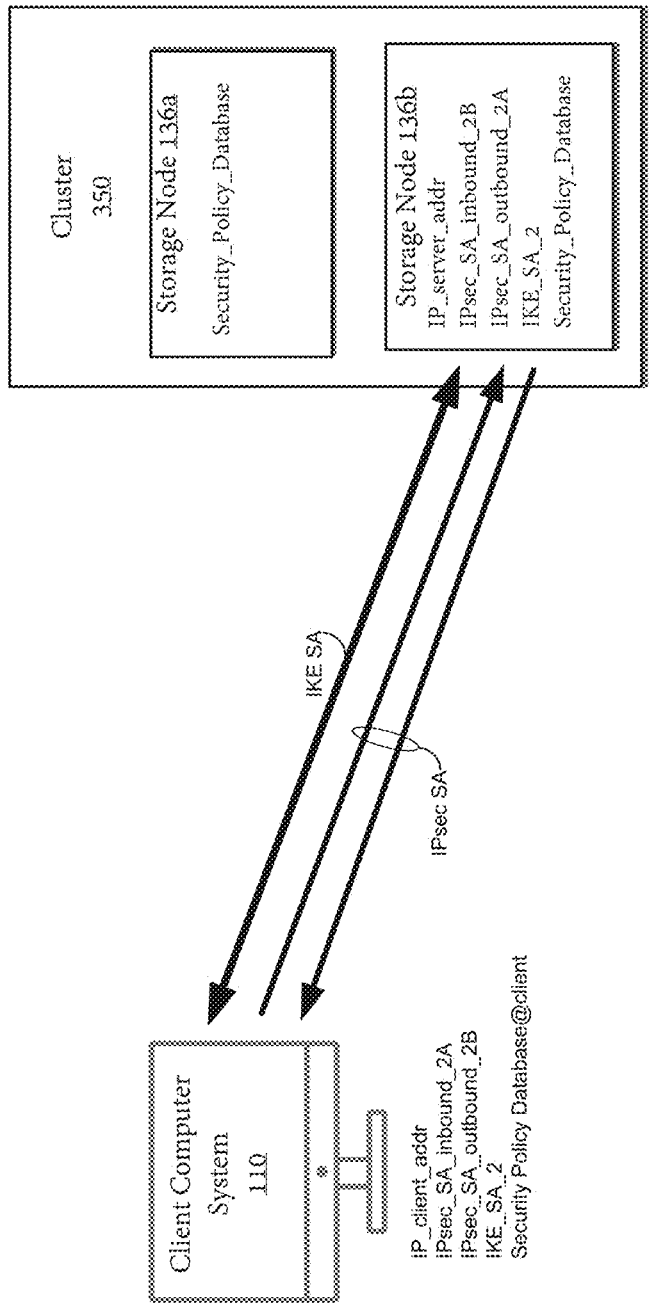

As discussed above, storage OS 210 provides access to data stored by the storage node 200. In one embodiment, storage OS 210 is also implemented to facilitate IKE SA and IPsec SA communication sessions with clients. In a further embodiment, storage OS 210 may be implemented to initiate and establish the IKE SA and IPsec SA communication sessions. FIGS. 3A-3C illustrate embodiments of communication sessions between a client and a two node cluster. For example, FIG. 3A illustrates a pair of inbound (IB) and outbound (OB) IPsec SAs between an address (e.g., IP_client_addr) at client 110 and an address (e.g., IP_server_addr@Node1) at a storage node 136a within cluster 350). As shown, the client 110 IB SA key is the same as the server (e.g., cluster 350) OB SA, and the client 110 OB SA key is the same as the server IB SA. Additionally, two way traffic is transmitted between client 110 and the server under IPsec protection, while a security policy database is replicated on all nodes of a cluster.

FIG. 3B illustrates a scenario in which the IP_server_addr has been migrated to node 136b (e.g., due to node 136a undergoing an upgrade and requiring a reboot, or the port associated with node 136a going down). As shown in FIG. 3B, all previous established IKE SA and IPsec SA at 136a have been flushed. Moreover, there may not have been sufficient time to notify client 110 to perform a cleanup. As a result, client 110 continues to transmit packets protected by IPsec_SA_outbound_1B to IP_server_addr, which is now hosted at node 136b. However, the packets will be dropped since the IP_server_addr at node 136b does not recognize IPsec_SA_outbound_1B. Further, there is no feedback to client 110 since there is no longer an IKE SA with client 110. Therefore, client 110 will continue to transmit packets that will continue to be dropped by the server until the next rekey time, which could be hours later.

Figure 4:
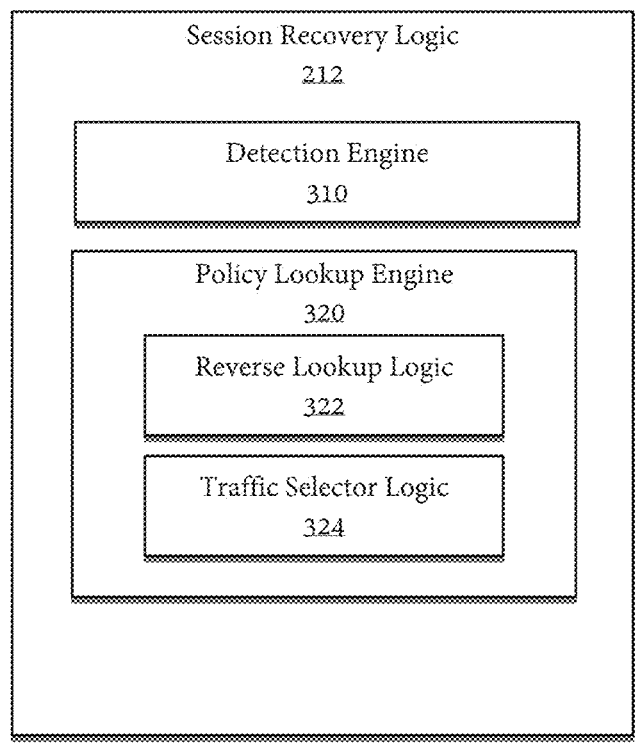
FIG. 4 illustrates one embodiment of session recovery logic.

According to one embodiment, storage OS 210 includes session recovery logic 212 implemented to detect unrecognized IPsec packets and to initiate and re-establish the IKE SA and IPsec SA connections (or sessions) between a client and the node within a server to which an IP address has been migrated. FIG. 4 illustrates one embodiment of session recovery logic 212 including detection engine 310 and policy lookup engine 320. Detection engine 310 is implemented to detect unrecognized IPsec packets that have been received at a server. In one embodiment, detection engine 310 detects unrecognized packets by parsing a received IPsec packet and determining that the packet header includes a security parameter index (SPI) that does not match an entry in the server's security association database.

Policy lookup engine 320 includes reverse lookup logic 322 that is implemented to perform a reverse IPsec policy lookup of a security policy database using unrecognized packets. Typically, IPsec policy lookup happens at the outbound path, traffic selector fields (e.g., source IP address, destination IP address, upper layer protocol, source port number, destination port number) are retrieved from an outbound packet, and then used to search the IPsec policy table. In one embodiment, the IPsec policy table includes entries that specifies IPsec actions. For example, one entry may read, "source ip 1.1.1.1 to destination 2.2.2.2, tcp packet, from any source port to destination port 5555, use IPsec ESP protection and cipher suite algorithms set A". IKE negotiation will be triggered to negotiate IPsec SAs upon a determination that an IPsec policy is matched, but there is not yet an IPsec SA to protect this outbound packet.

However, for an inbound unrecognized IPsec packet, traffic selector logic 324 retrieves traffic selector fields (e.g., source IP address, destination IP address) included within a header of the unrecognized IPsec packet. Traffic selector fields are retrieved since all other information, such as upper layer protocol or port numbers, are encrypted. Accordingly, an inbound packet is implemented to trigger the reverse IPsec policy lookup. As defined herein, a traffic selector is an agreement between IKE peers to permit traffic through a tunnel if the traffic matches a specified pair of local and remote addresses. With this feature, a traffic selector may be defined within a specific route-based VPN, which can result in multiple Phase 2 IPsec security associations (SAs).

Reverse lookup logic 322 uses the retrieved traffic selector fields to query the security policy database to determine whether a destination IP address included in the retrieved selector fields matches one or more outbound IPsec policies. In one embodiment, the matching outbound IPsec policy is determined by swapping the source and destination IP addresses and ignoring an upper layer protocol and source and destination port numbers specified in the IPsec policy table. Upon a determination that a matching IPsec policy has been found, IKE negotiation is initiated from the server side to re-establish the IPsec session.

After the negotiation, a pair of IKE SAs are established between the client and node for any further secure negotiation and notification, as well as a pair of IPsec SAs to secure traffic matching the policy selected by reverse IPsec policy lookup. However, in some embodiments, multiple IPsec policies between the two endpoints may be found. In such an embodiment, the IPsec session may not be established since the appropriate IPsec policy negotiation may not be implemented (e.g., because fields in the reverse policy lookup have been ignored).

Nevertheless, a pair of IKE SAs are available to exchange secure notifications. Thus, a synchronization may be performed with the client for IPsec SA renegotiation when necessary. FIG. 3C illustrates a communication session between client 110 and node 136b after recovery has been performed by session recovery logic 212. As shown in FIG. 3C, an IKE SA and IPsec SA (e.g., IB and OB IPsec SAs) communication sessions have been established between client 110 and storage node 136b after the recovery.

Figure 5:
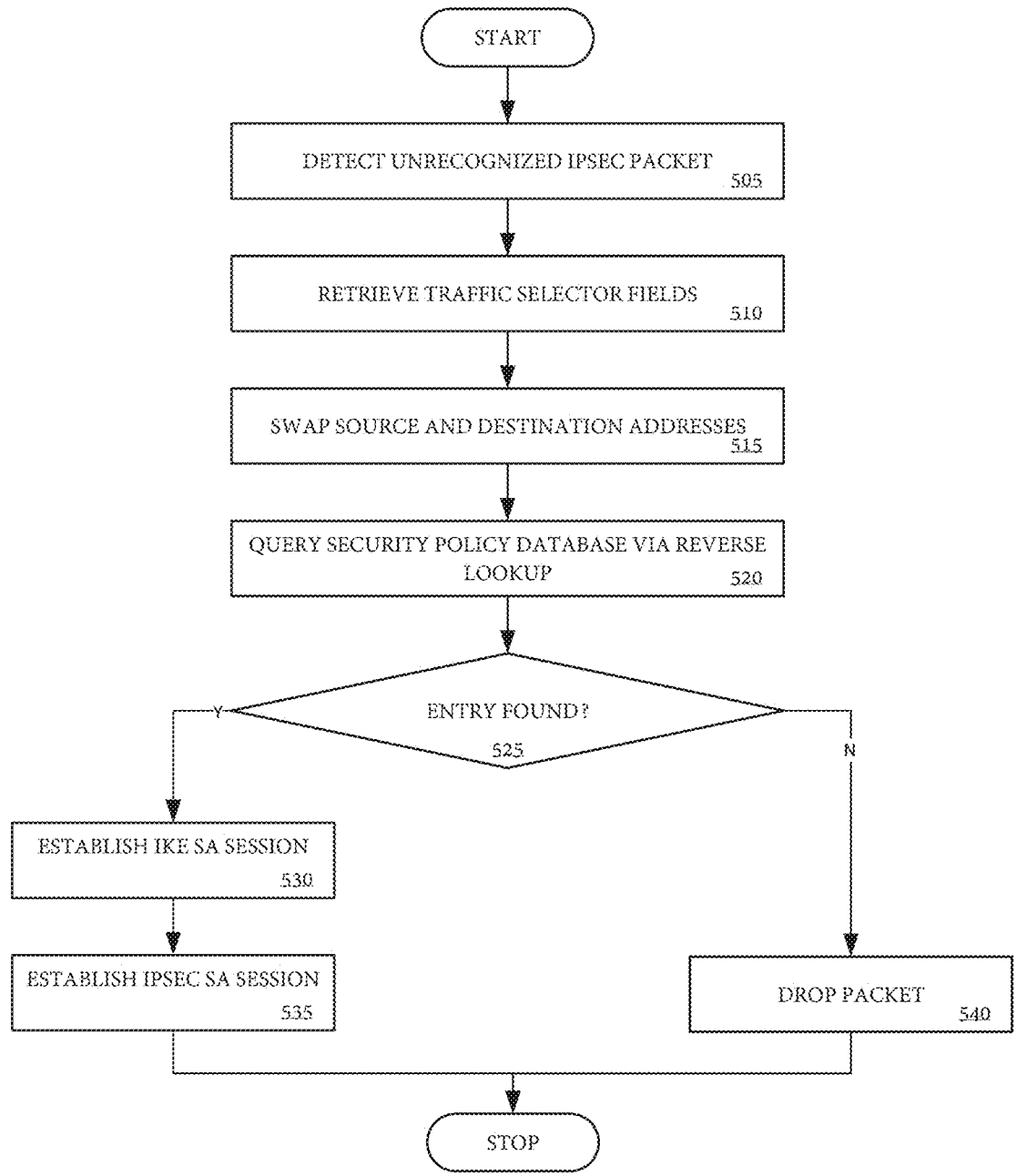
FIG. 5 is a flow diagram illustrating one embodiment of a session recovery process.

FIG. 5 is a flow diagram illustrating one embodiment of a session recovery process. At processing block 505, an inbound unrecognized IPsec packet is detected. At processing block 510, one or more traffic selector fields from the packet are retrieved. At processing block 515, the source and destination addresses of the selector fields are swapped. At processing block 520, the security policy database is queried via a reverse policy lookup to determine whether the database includes an IPsec policy associated with the source/destination address entry (e.g., peer, ignore source port number, destination port number and protocol requirement, if any) to establish an IPsec SA communication session.

At decision block 525, a determination is made as to whether an entry has been found. If so, a negotiation is performed to establish an updated IKE SA communications session, processing block 530 using the policy information. At processing block 535, an IPsec SA communications session between the server and client is negotiated using the policy information. Upon a determination at decision block 525 that no policy has been found, the unrecognized IPsec packet will be dropped, processing block 545. In one embodiment, the IPsec packet will be dropped upon a determination that the security policy database does not include an IPsec policy associated with the client to prevent a denial of service attack. In a further embodiment, a negotiation attempt limit is implemented even in instances in which there is an IPsec policy associated with the client.

Since only the reversed source IP address and destination IP address were used to query the security policy database, it is possible to negotiate an IPsec communications session using an incorrect policy if there are multiple policies matching the source and destination IP addresses. However, the IKE SA performs further negotiations since there is already an IKE SA setup between the server and the client. Also, the IKE SA will serve as a secure channel for data exchange should there be any unrecognized inbound IPsec SA.

Figure 6:
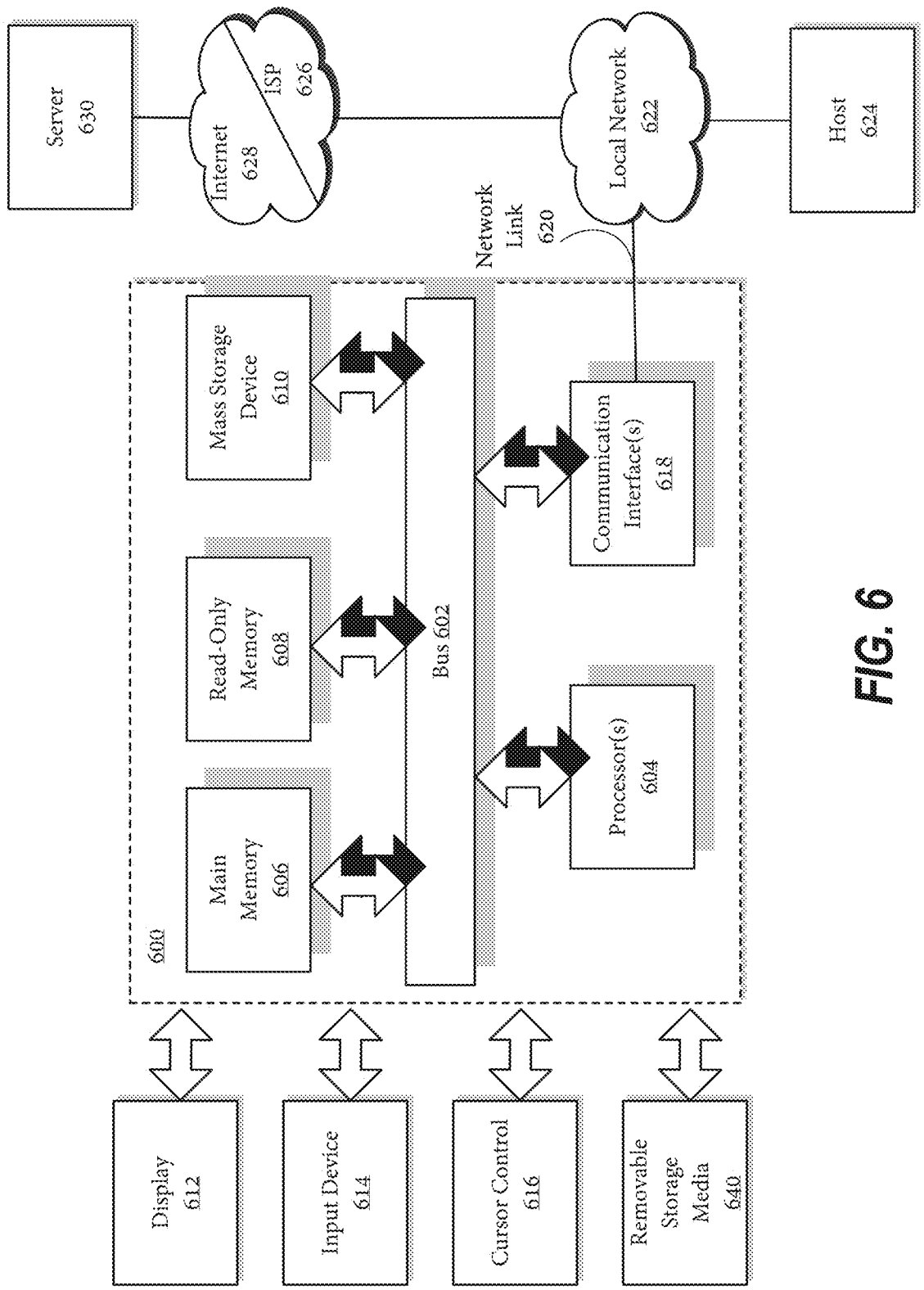
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may be representative of all or a portion of the computing resources associated with a storage node (e.g., storage node 136), a collector, a monitoring system or an administrative workstation (e.g., client computer system 110). Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 930 might transmit a requested code for an application program through Internet 628, ISP 626, local network 622 and communication interface 618. The received code may be executed by processor 604 as it is received, or stored in storage device 610, or other non-volatile storage for later execution.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method performed by one or more processing resources of one or more computer systems, the method comprising:
    detecting an unrecognized Internet Protocol Security (IPsec) packet associated with an IP address at a first node within a cluster;
    retrieving one or more selector fields from the IPsec packet upon detecting the unrecognized IPsec packet;
    querying of a security policy database to determine whether a destination IP address included in the one or more retrieved selector fields matches one or more matching outbound IPsec policies associated with the destination IP address;
    determining whether a matching outbound IPsec policy includes an IPsec policy associated with the destination address entry; and
    establishing the first IPsec SA communication session between the first node and the client based on the outbound IPsec policy.

2. The method of claim 1, further comprising establishing a first Internet Key Exchange (IKE) communication session between the first node and the client based on the outbound IPsec policy.

3. The method of claim 2, further comprising dropping the unrecognized IPsec packet upon a determination that there is no matching outbound IPsec policy associated with the destination address entry.

4. The method of claim 3, further comprising determining whether there are a plurality of matching outbound IPsec policies associated with the destination address entry.

5. The method of claim 4, further comprising establishing a second IPsec SA using the first IKE communication session upon a determination that there are a plurality of matching outbound IPsec policies associated with the destination address entry.

6. The method of claim 5, further comprising:
    establishing the first IKE communication session between a second node within the cluster and the client prior to detecting the unrecognized Security (IPsec) packet at the first node; and
    establishing the IPsec SA communication session between the second node and the client.

7. The method of claim 6, further comprising migrating the IP address from the second node to the first node.

8. The method of claim 1, further comprising swapping a source addresses and the destination IP address included in the selector fields prior to querying the security policy database.

9. The method of claim 8, wherein the querying of the security policy database comprises a reverse policy lookup.

10. A non-transitory computer-readable storage medium embodying a set of instructions, which when executed by a processing resource cause the processing resource to:
    detect an unrecognized Internet Protocol Security (IPsec) packet associated with an IP address at a first node within a cluster;
    retrieve one or more selector fields from the IPsec packet upon detecting the unrecognized IPsec packet;
    query of a security policy database to determine whether a destination IP address included in the one or more retrieved selector fields matches one or more matching outbound IPsec policies associated with the destination IP address;
    determine whether a matching outbound IPsec policy includes an IPsec policy associated with the destination address entry; and
    establish the first IPsec SA communication session between the first node and the client based on the outbound IPsec policy.

11. The computer-readable storage medium of claim 10, embodying a set of instructions, which when executed by the processing resource further cause the processing resource to establish a first Internet Key Exchange (IKE) communication session between the first node and the client based on the outbound IPsec policy.

12. The computer-readable storage medium of claim 11, embodying a set of instructions, which when executed by the processing resource further cause the processing resource to drop the unrecognized IPsec packet upon a determination that there is no matching outbound IPsec policy associated with the destination address entry.

13. The computer-readable storage medium of claim 12, embodying a set of instructions, which when executed by the processing resource further cause the processing resource to determine whether there are a plurality of matching outbound IPsec policies associated with the destination address entry.

14. The computer-readable storage medium of claim 13, embodying a set of instructions, which when executed by the processing resource further cause the processing resource to establish a second IPsec SA using the first IKE communication session upon a determination that there are a plurality of matching outbound IPsec policies associated with the destination address entry.

15. The computer-readable storage medium of claim 14, wherein the querying of the security policy database comprises a reverse policy lookup.

16. A system comprising:
    a processing resource; and
    a non-transitory computer-readable medium, coupled to the processing resource, having stored therein instructions that when executed by the processing resource cause the processing resource to detect an unrecognized Internet Protocol Security (IPsec) packet associated with an IP address at a first node within a cluster, retrieve one or more selector fields from the IPsec packet upon detecting the unrecognized IPsec packet, query of a security policy database to determine whether a destination IP address included in the one or more retrieved selector fields matches one or more matching outbound IPsec policies associated with the destination IP address, determine whether a matching outbound IPsec policy includes an IPsec policy associated with the destination address entry and establish the first IPsec SA communication session between the first node and the client based on the outbound IPsec policy.

17. The system of claim 16, further comprising the non-transitory computer-readable medium, coupled to the processing resource, having stored therein instructions to establish a first Internet Key Exchange (IKE) communication session between the first node and the client based on the outbound IPsec policy.

18. The system of claim 17, further comprising the non-transitory computer-readable medium, coupled to the processing resource, having stored therein instructions to drop the unrecognized IPsec packet upon a determination that there is no matching outbound IPsec policy associated with the destination address entry.

19. The system of claim 18, further comprising the non-transitory computer-readable medium, coupled to the processing resource, having stored therein instructions to determine whether there are a plurality of matching outbound IPsec policies associated with the destination address entry.

20. The system of claim 19, further comprising the non-transitory computer-readable medium, coupled to the processing resource, having stored therein instructions to establish a second IPsec SA using the first IKE communication session upon a determination that there are a plurality of matching outbound IPsec policies associated with the destination address entry.

* * * * *